(No Model.) 2 Sheets—Sheet 1.
H. A. BURGESS.
COMBINED HAY RAKE, LOADER, UNLOADER, AND STACKER.
No. 463,937. Patented Nov. 24, 1891.
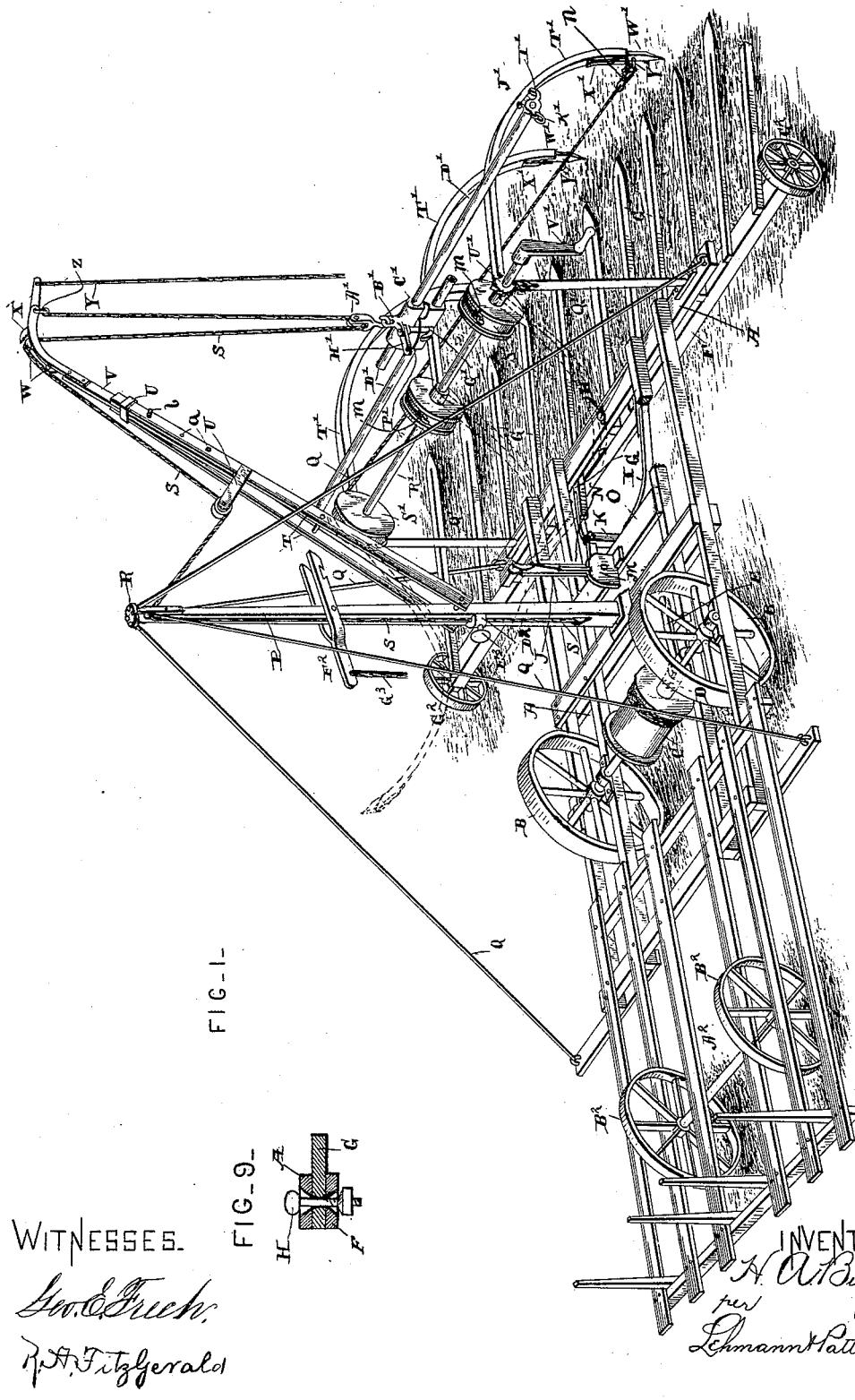

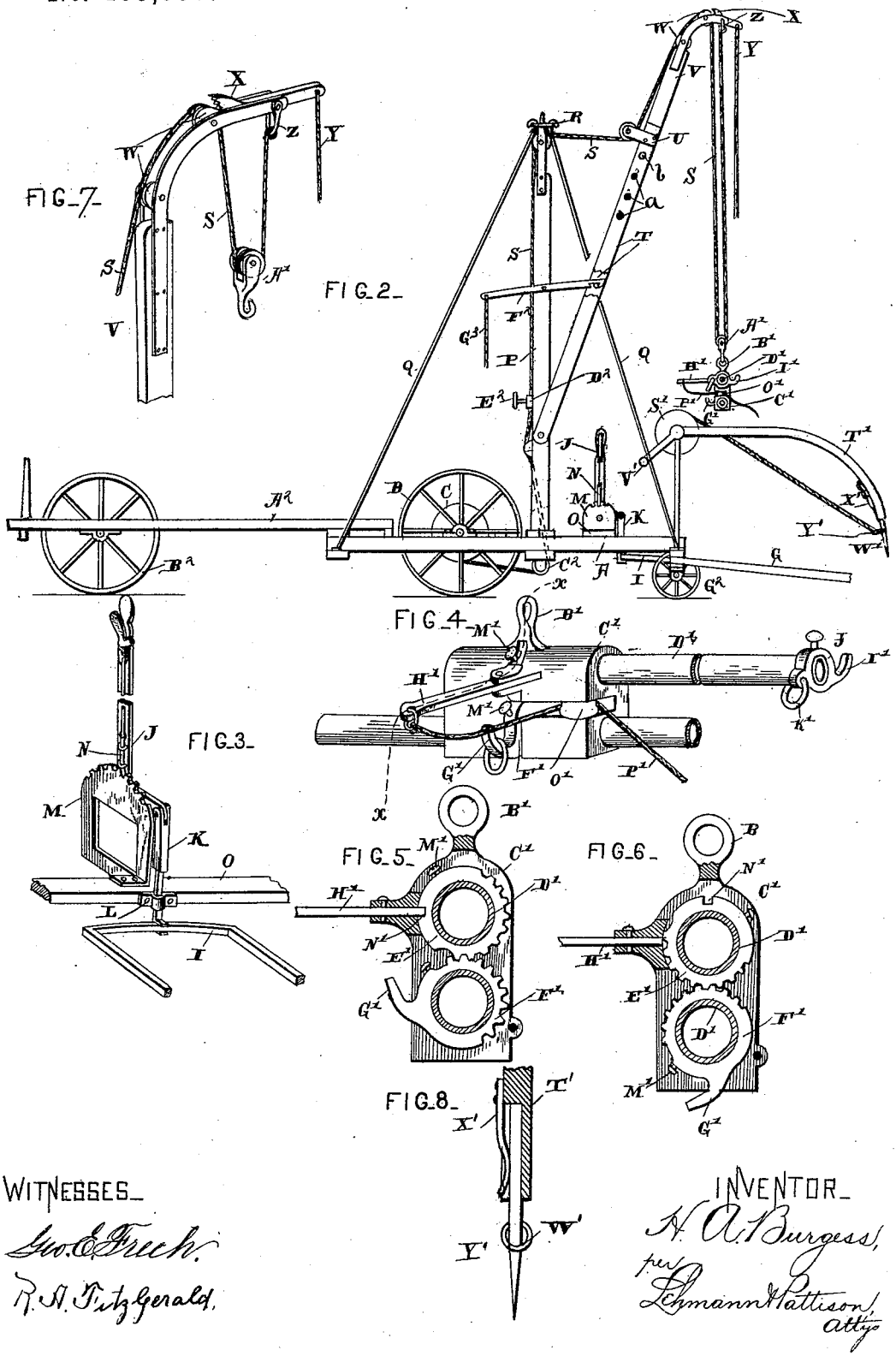

mode
UNITED STATES PATENT OFFICE.

HARRY A. BURGESS, OF GOODLAND, INDIANA.

COMBINED HAY RAKE, LOADER, UNLOADER, AND STACKER.

SPECIFICATION forming part of Letters Patent No. 463,937, dated November 24, 1891.

Application filed May 4, 1891. Serial No. 391,486. (No model.)

*To all whom it may concern:*

Be it known that I, HARRY A. BURGESS, of Goodland, in the county of Newton and State of Indiana, have invented certain new and useful Improvements in Combined Hay Rakes, Loaders, Unloaders, and Stackers; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rakes, loaders, unloaders, and stackers; and it consists in the construction and arrangement of parts, which will be fully described hereinafter.

The object of my invention is to construct a hay-rake with a bunching or baling mechanism and with an elevating apparatus, whereby the hay can be raked from the field, gathered into bales or bunches, and then elevated for the purpose of loading it, or stacked, as may be desired, and to construct a mechanism for dropping the hay either in a baled or loose form.

Figure 1 is a perspective view of a machine which embodies my invention complete. Fig. 2 is a side elevation of the same. Fig. 3 is a detached perspective view of the mechanism for raising and lowering the rake-teeth. Fig. 4 is a detached perspective view of the sling-arms. Fig. 5 is a vertical section of Fig. 4 on the dotted line $x\ x$, showing the tripping mechanism set. Fig. 6 is a similar view showing the tripping mechanism in a tripped position. Fig. 7 is an enlarged view of the outer and upper end of the pivoted derrick-arm. Fig. 8 is a vertical section taken through the outer end of one of the bunching-arms. Fig. 9 is a detached vertical section taken through the pivotal bolt H.

In the drawings, A indicates the main frame, which is supported at its rear end upon the driving-wheels B, which are rigidly secured to the shaft and revolve therewith, and upon this shaft is placed a drum C. The drum revolves loosely upon the said shaft, and is locked thereto by means of a clutch D, which slides upon the shaft and is caused to rotate therewith by engaging a feather upon the shaft in the usual manner, and which is operated by means of a pivoted operating-lever E.

Pivoted to the front end of the frame A is a truck F, which carries the rake-teeth G, and this truck is supported at each side by means of the wheels $G^2$. The front end of the frame rests upon the said truck, and is pivoted thereto by a pivotal bolt H, which allows the truck to turn and the machine thereby guided and turned in any desired direction. Extending rearward from the said truck is a U-shaped plate or bar I. Pivoted upon a cross-bar of the frame A is an L-shaped lever J, the front end of which is connected to the U-shaped bar I by means of a link or rod K, which moves in a bearing L upon the frame A. This lever or bar I is held in any desired position by means of the toothed quadrant M and the spring-catch N. By means of this lever the front ends of the rake-teeth F can be raised and lowered, the axles of the truck turning in the wheels $G^2$, while at the same time the said truck can be turned upon the pivotal bolt H, as will be readily seen.

Secured crosswise to the frame A is a block or heavy board O, in the center of which the lower end of the standard P is pivoted, the upper end of the said standard being pivoted in a ring R, to which the upper ends of the guy-ropes Q are secured. The lower end of the said standard is hollow, so that the elevating-rope S can pass up through it from the drum C, as shown. Pivoted at its lower end to the standard P is an arm T, which is composed of two boards, as shown, which are slightly separated and secured together by means of castings U, through which castings a bar or arm V passes, and is longitudinally adjustable in the said arm for the purpose of lengthening it. One or more of the said castings and the arm V are provided with perforations $a$, which register, and the arm is held in any desired adjustment by means of a pin $b$, which passes through the said openings. Journaled in the outer end of the arm V are the two rollers or sheaves W, over which the operating-rope S passes, and a clutch-lever X for holding the said rope between it and the outer sheave W. This clutch is operated by means of an operating-rope Y. The rope S passes over the sheave W, through a swinging pulley A', and has its opposite end secured to a ring Z, at the outer end of the arm V. This swinging pulley A' is provided with a hook, which catches in an eye B' upon a casting C'. Made in this casting are two horizontal circular openings, through which loosely pass the hollow pipes D'. Each of these pipes D' is provided with the castings J' upon its outer ends, and these castings are each provided with a ring K' upon one side and a hook I' upon the opposite side. Placed in a vertical opening made in the casting C', between its ends, are the wheels or rings E' and F', each of which is provided with intermeshing cogs, as shown in Figs. 5 and 6. The hollow pipes D' pass through these wheels and are adjustably held therein by set-screws M'. Formed upon the lower wheel F' is a hook G', and formed in the upper wheel E' is a notch N', which is engaged by a lever H', pivoted in the casting C', the object of which mechanism will be mentioned hereinafter. Journaled in the side of the said casting is a wheel O', around which an operating-cord P' passes, one end of which is attached to the lever H'. Projecting upward from the frame A are the standards or supports Q', in the upper ends of which is journaled a horizontal shaft R', to which are secured any desired number of drums S'. Placed upon one end of this shaft is a ratchet-wheel U', by means of which and a pawl the shaft is prevented from revolving in one direction, and also a handle V', for revolving the said shaft. Also secured to the said shaft at their inner ends, by means of set-screws, are the forwardly and downwardly extending bunching-arms T'. The outer ends of these arms are provided with vertical slots or openings, in which the upper ends of the spikes or pegs W' are placed and held therein by the frictional contact of the springs X'. These spikes are each provided with a ring Y', below the ends of the arms T'. The operation and purpose of the mechanism just described will be fully specified hereinafter.

A cart or rack A² has its forward end resting upon the rear end of frame A and its rear end supported upon suitable wheels B², the object of which will be mentioned presently. The operating-rope passes out of the lower hollow end of the standard P a suitable distance above its lower end and around a guiding pulley or sheave. Extending from the said standard is a socket D², through which the said rope passes, and passing into this socket is a screw-rod E², which may either have its inner end engage the rope or engage a shoe, which latter will rest upon the rope, as will be readily understood, and by means of which a friction-brake is constructed for regulating the descent of the sling and the arm. Pivoted upon this standard near its upper end is a latch F², which engages and supports the pivoted arm in the position shown in Fig. 1, and to this latch an operating-cord G³ is secured.

The operation of my invention is as follows: The machine is drawn forward by means of horses in the usual manner until a desired quantity of hay is accumulated upon the rake-teeth. Ropes are attached at one end to the rings upon the spikes W' and at their opposite ends to the drums S'. The arms T' are then thrown forward and downward and the spikes forced in the ground, as shown in Fig. 1, by the handle V', and then thrown backward, as shown in dotted lines in Fig. 1, leaving the spikes with the ropes attached in the ground. The machine is then driven forward over the spikes, the arms again thrown forward, and the ropes detached from the spikes and connected to the drum, when by revolving the shaft backward the hay is tightly wrapped into a bunch by the ropes. The ends of the ropes are then detached from the drums, but held together by the hands of the operator and placed over the hooks I' upon the sling-arm, and as the machine is driven forward for another load the hay is elevated, while the arm is held in a raised position by the latch F², by the drum C, around which the elevating-rope S passes. The standard is then turned and the hay dropped upon a wagon at either side of the front of the machine or upon the cart A² at the rear of the machine. By unhooking the lower ends of the guy-ropes at either side of the machine the standard P can be revolved for the purpose of bringing the elevating-arm T to either side of the machine or around to the rear, as will be readily understood. When the hay is elevated over the desired object, it is dropped by operating the latch H', which allows the rods D' to revolve, and the ring on the end of the rope slipped off the hooks. The ropes are provided at one end with a ring m and at the other with a snap-hook n. When it is desired to drop the hay in bunches, as just described, the snap-hook is secured in the ring at the opposite end of the rope, and the ring passed over the hooks upon the said sling-arms. If it is desired to drop the hay loose, the snap-hooks are secured in the rings upon the sling-arms and the rings of the ropes placed over the hooks on the arms. By thus attaching them it will be readily seen that when the arms are allowed to revolve, the rings slip off the hooks while the opposite ends of the ropes remain attached to the arms, thus dropping the hay in a loose pile. By means of a machine of this construction the hay is gathered and loaded upon a wagon or upon the cart at the rear of the machine to be taken to a stack. When the hay is to be stacked, the elevating-arm is turned around to the rear of the machine and the sling attached to the bunches which are on the rack and raised to the stack by starting the machine.

Having thus described my invention, I claim—

1. In a machine of the character described, a frame, rake-teeth at its front end, bunching-arms having their front ends bent downward and their upper ends pivotally supported above the teeth, a means for connecting one end of ropes to the outer ends of the said arms, a support for the other ends of the ropes, a means for oscillating the said arms, and an elevating apparatus, the parts combined substantially as described.

2. In a machine of the character described, a frame, rake-teeth at the front of the frame, a shaft journaled above the said teeth, forwardly and downwardly extending bunching-arms having their inner ends connected to the said shaft, drums upon the said shaft, a means for connecting ropes to the outer ends of the said arms and to the said drums, and an elevating apparatus, the parts combined substantially as specified.

3. A truck having rake-teeth, a frame at the rear thereof, a standard upon the frame, an arm pivoted upon the standard provided with a pulley at its outer end, an elevating-rope passing over the pulley, a sling-arm connected with the rope, and a means for operating the rope, substantially as described.

4. A truck having rake-teeth, a revolving shaft, a bunching-arm secured at its inner end to the shaft, its outer end curved downward, a detachable spike at its outer end, and a tying-rope connected at one end to the said spike, the parts combined substantially as shown.

5. A truck having rake-teeth, a revolving shaft, a bunching-arm secured at its inner end to the said shaft and having its outer end curved downward, a detachable spike at its outer end, a drum upon the shaft, and a tying-rope, one end of which is attached to the spike and its opposite end to the drum, substantially as described.

6. A sling-trip consisting of a casting carrying intermeshing wheels, rods connected to the wheels having laterally-extending hooks, and a means for locking and releasing the wheels, the parts combined to operate substantially as described.

7. A sling-trip consisting of a casting having longitudinal openings, rods which are journaled therein having hooks at one side of their outer ends, the inner ends of the rods being connected to revolve together, and a means for locking and releasing the inner ends of the rods, the parts combined substantially as set forth.

In testimony whereof I affix my signature in presence of two witnesses.

HARRY A. BURGESS.

Witnesses:
CHAS. A. WELCH,
E. E. MARSH.